(12) United States Patent
Hubert (10) Patent No.: US 6,908,642 B2
(45) Date of Patent: Jun. 21, 2005

(54) METHOD OF SEALING AN AIRCRAFT WING

(76) Inventor: Christopher J. Hubert, 50148 Hedgeway Dr., Shelby Township, MI (US) 48317

(*) Notice: Subject to any disclaimer, the term of this patent is extended or adjusted under 35 U.S.C. 154(b) by 214 days.

(21) Appl. No.: 10/225,884

(22) Filed: Aug. 22, 2002

(65) Prior Publication Data

US 2004/0005411 A1 Jan. 8, 2004

Related U.S. Application Data

(60) Provisional application No. 60/394,349, filed on Jul. 3, 2002.

(51) Int. Cl.[7] ................................................ B05D 1/26
(52) U.S. Cl. ...................................... 427/256; 427/287
(58) Field of Search ................................ 427/256, 258, 427/287, 207.1; 29/458–460, 527.1, 527.4, 527.2; 118/500, 503; 901/43, 46–47

(56) References Cited

U.S. PATENT DOCUMENTS

| | | | |
|---|---|---|---|
| 3,907,442 A | * | 9/1975 | Reid ............................ 403/37 |
| 4,590,578 A | * | 5/1986 | Barto et al. ................. 700/254 |
| 4,639,878 A | | 1/1987 | Day et al. |
| 4,821,408 A | | 4/1989 | Speller et al. |
| 4,951,849 A | | 8/1990 | Townsend et al. |

* cited by examiner

Primary Examiner—Fred J. Parker
(74) Attorney, Agent, or Firm—Young & Basile, P.C.

(57) ABSTRACT

A workstation for sealing the spar of an aircraft. A robotic arm can be positioned on a platform with a sealant application system. The platform can be moved along a path adjacent the spar to move the robotic arm. The robotic arm can move the applicator of a sealant applying system to a portion of a spar that is to be sealed. The sealant system can be positioned on the platform to be moveable along the path. The robotic arm can be moveable relative to the platform. The path can be positioned overhead of the spar. The spar can be rotated by a rotating fixture so that the platform can be moved in opposite directions relative to the path. A controller can control the movement of the platform along the path, movement of the robotic arm relative to the platform, movement of the applicator by the robotic arm, and the application of sealant by the sealant applying system.

14 Claims, 7 Drawing Sheets

METHOD OF SEALING AN AIRCRAFT WING

RELATED APPLICATIONS

This application is a continuation of U.S. Provisional Application Ser. No. 60/394,349 filed Jul. 3, 2002.

FIELD OF THE INVENTION

The invention relates to a workstation for processing the wing of an aircraft, and, more particularly, to a workstation for sealing the spar of the wing of an aircraft.

BACKGROUND OF THE INVENTION

Wing is a general term applied to a surface designed to develop lift. The cordwise cross-section of the wing is an airfoil shape. The plan form of the wing may be rectangular, triangular, trapezoidal, elliptical or a combination of a rectangular root section with a trapezoidal or rounded tip sections. Generally, the plan form of the wing is trapezoidal with slightly rounded tips for subsonic designs and triangular for transonic and supersonic designs in order to obtain a sweep back angle equal to or greater than the mach angle.

Generally, the wing is composed of a surface, of members supporting that surface in the external shape of the desired airfoil, and of an underlying structural framework to support the members. The structural framework conveys lift to the fuselage of an aircraft. Typically, the structural framework is defined by one or more spars and ribs fastened to the spars at intervals along the length of the spars.

Spars can be constructed of wood or metal. Usually wood is preferred for small or medium sized airplanes, whereas metal in the form of drawn or extruded shapes, tubes, corrugations, is used for the built-up spars of larger airplanes. Built-up spars are constructed with several members fastened together, for example, by riveting. In many aircraft applications it is preferred to seal the several members of the built-up spar relative to one another.

SUMMARY OF THE INVENTION

The present invention provides an apparatus and method for sealing a spar. The invention provides a path extending adjacent a spar to be processed. The invention also provides a robot moveable along the path to apply sealant to at least a portion of the spar. The sealant can be applied to fasteners joining structural members of the spar or to seams defined by two or more structural members of the spar.

One or more predetermined positions can be defined along the path and the robot can be moved between the predetermined positions. The robot can be moved along to the path to a first predetermined position and apply sealant to a first portion of the spar. After sealant has applied to the first portion of the spar, the robot can be moved to a second predetermined position and sealant can be applied to a second portion of the spar. The path can be defined by mounting blocks or by one or more rails. In an embodiment of the invention including a mounting block, a pin can be inserted in an aperture of the robot to maintain the robot in a fixed position along the path relative to the spar. The path can be positioned above the spar or along side the spar.

The robot moveable along the path can include a platform and a robotic arm. The robotic arm can be positioned on the platform and be moveable relative to the platform. The invention also includes a sealant applicator positionable on the robot arm, a pump having a reservoir of sealant, and tubing connecting the applicator and the pump. The applicator can include a standard applicator for applying a bead of sealant over a fastener such as a rivet. The applicator can also include a swirling applicator for applying sealant along a seam. The pump can be positioned on the platform.

The invention also provides means for moving the platform along the path. The platform can be moved along the path with motors and tow cables or can be moved with a motor positioned on the platform. The invention also provides means for moving the robotic arm relative to the platform. The movement of the platform along the path and the robotic arm relative to the platform can be controlled to precisely position the robotic arm at any desired position along the length of the spar.

The movement of the platform along the path, movement of the robot arm along the platform, and movement of the applicator by the robot arm can be controlled by a controller. The controller can move the platform to a position along the path and can move the robot to a position on the platform to precisely move the applicator to the portion of the spar to be sealed. The controller can control the flow sealant including the amount of sealant applied to the spar and the pattern or trajectory of the application such as a bead of sealant or a tract of sealant. The controller can be positioned on the platform and moveable along the path. When the sealing of a particular portion of the spar is complete, the controller can move the robot arm and platform as necessary to position the applicator adjacent the next portion of the spar to be sealed.

Position sensors can be positioned along the path or can be associated with the means for moving the platform. The position sensors can emit a signal corresponding to a position of the robot along the path to the controller. The controller can receive the signal and control the movement of the platform and movement of the robot arm in response to the signal.

The invention can also include a machine vision system. At least one camera of a machine vision system can be positioned on the robotic arm. As the robot arm is moved towards the portion of the spar to be sealed, the camera of the machine vision system can emit a signal to the controller corresponding to the position of the robotic arm relative to the spar. The controller can receive the signal and adjust the movement of the robotic arm to apply sealant as desired.

The robotic arm can selectively move in opposite directions along the path to apply sealant to the second side of the spar. Specifically, the robotic arm can be moved the length of the path in a first direction along a first side of the spar to apply sealant to portions of the spar to be sealed. After the sealing operations have been performed on a first side of the spar, the spar can be rotated by a fixture. The controller can rotate the spar after the first side of the spar has been sealed to expose a second side of the spar to the robotic arm and applicator for the application of sealant to the second side. The robot can be moved the length of the path in a second direction, opposite the first direction, to apply sealant to portions of the spar to be sealed on the second side.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Various embodiments of the invention are shown throughout the figures. The figures include common elements in different structural configurations. Common elements are designated with a common base numeral and differentiated with an alphabetic designation.

Figure 1:
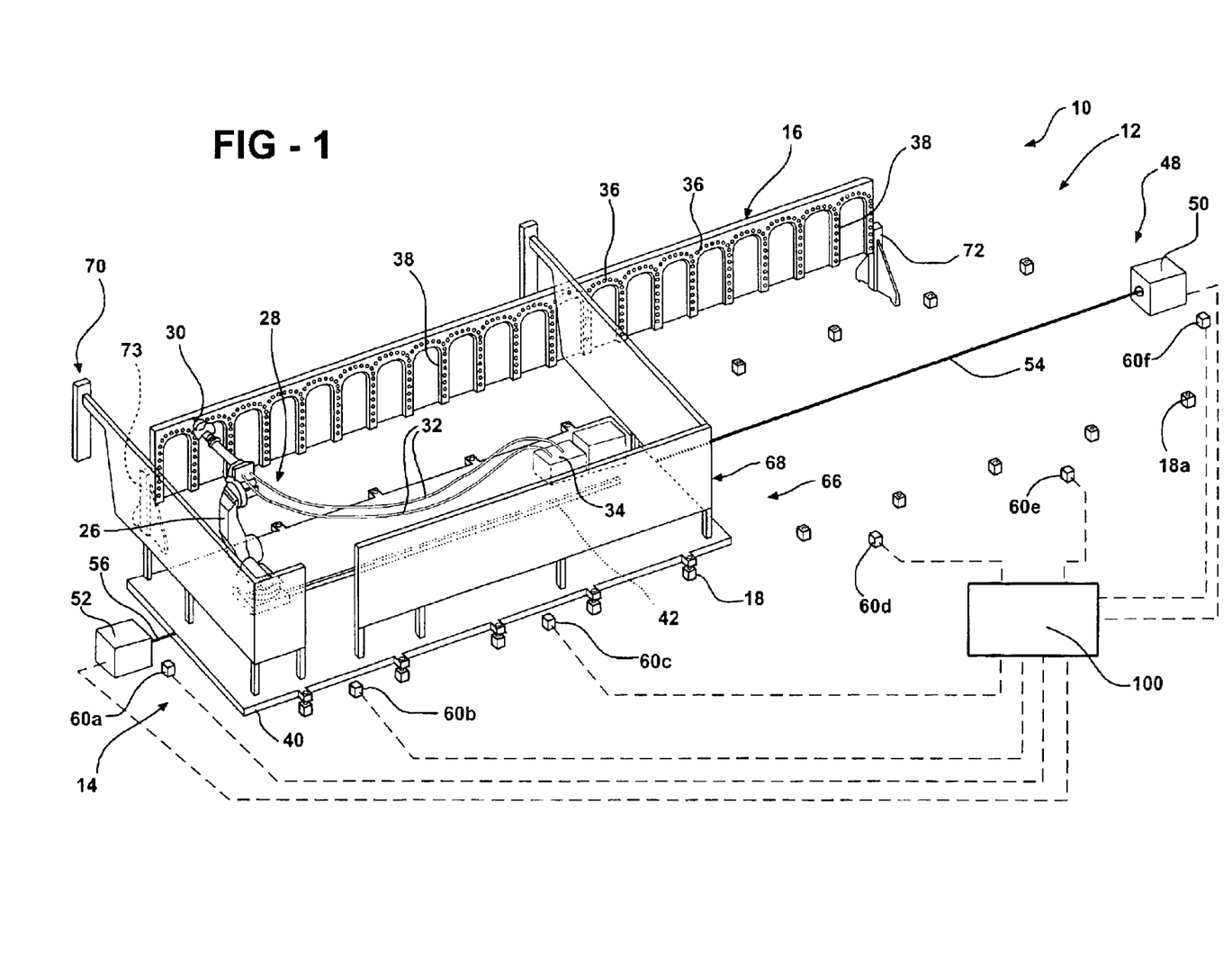
FIG. 1 is an isometric view of a workstation according to an embodiment of the invention including a platform and a robotic arm moveable with respect to the platform and moving means disposed along the path.

Referring now to FIG. 1, a workstation 10 according to an embodiment of the invention includes path means 12 and robotic means 14. The path means 12 defines a path adjacent a length of a spar 16. The path can be substantially parallel to the length of the spar 16. Robotic means 14 is moveable along path means 12 for applying sealant to at least a portion of the spar 16. Robotic means 14 can be moved to one or more predetermined positions defined along path means 12 and can apply sealant with respect to the spar 16 at one or more of the predetermined positions. Robotic means 14 can apply sealant to one or more portions of the spar 16 at each of the predetermined positions. The portions of the spar 16 to receive sealant can be disposed on a first side of the spar 16 or both sides of the spar 16.

Figures 2, 3:
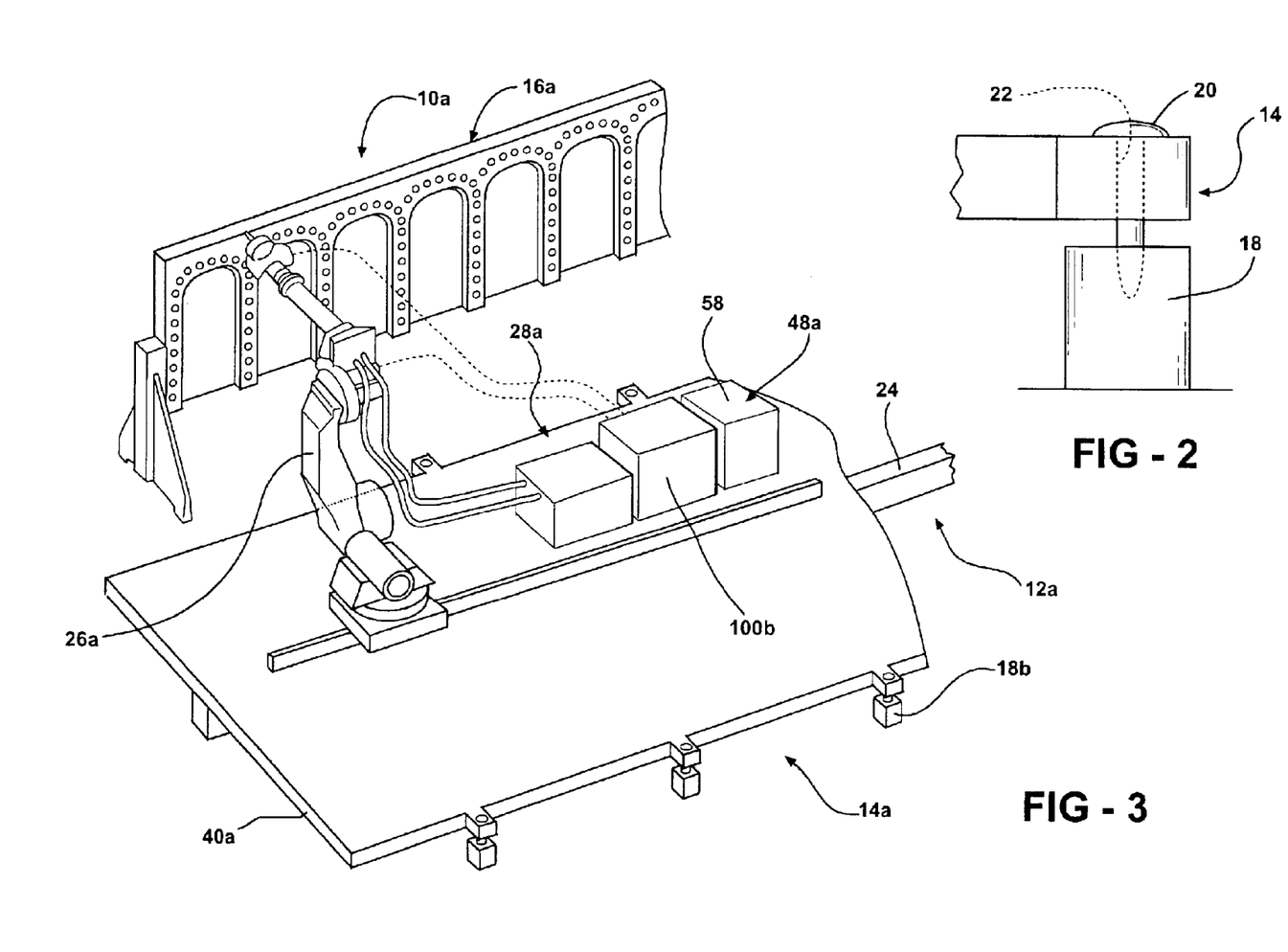
FIG. 2 is a detailed view of a mounting block for defining the path and a pin insertable in an aperture defined by robotic means.
FIG. 3 is an isometric view of an embodiment of the invention having a platform and moving means positioned on the platform.

Path means 12 includes at least one mounting block positioned adjacent the spar 16 for defining at least one predetermined position. In the embodiment of the invention shown in FIG. 1, path means 12 includes mounting blocks 18, 18a for defining two predetermined positions. For example, FIG. 1 shows robotic means 14 at a starting, or first predetermined position relative to the spar 16 defined by a mounting block 18. Robotic means 14 can be moved to a second predetermined position defined by mounting block 18a. Robotic means 14 can be maintained in the first position by a pin 20 engageable with mounting block 18. Referring now to FIG. 2, the pin 20 can be inserted in an aperture 22 defined by robotic means 14 to engage robotic means 14 and the mounting block 18. The pin 20, aperture 22 and mounting block 18 can quickly and consistently index robotic means 14 with respect to path means 12 and to the spar 16. The pin 20 can be cylindrical or can be shaped to locate robotic means 14 with respect to the spar 16. In particular, the pin 20 can include a key or be shaped to require a particular orientation of robotic means 14 with respect to the mounting block 18 when the pin 20 is engaged with respect to robotic means 14 and the mounting block 18. Preferably, a plurality of mounting blocks can be disposed at each position along the spar 16, each mounting block for receiving a pin individually engageable with one of a plurality of apertures defined by robotic means 14. When robotic means 14 is to be moved along the path means 12, the pin 20 can be removed from the aperture 22 and mounting block 18, robotic means 14 can be moved to a second predetermined position, and the pin 20 can be inserted with respect to the aperture 22 to engage mounting block 18a.

Figure 4:
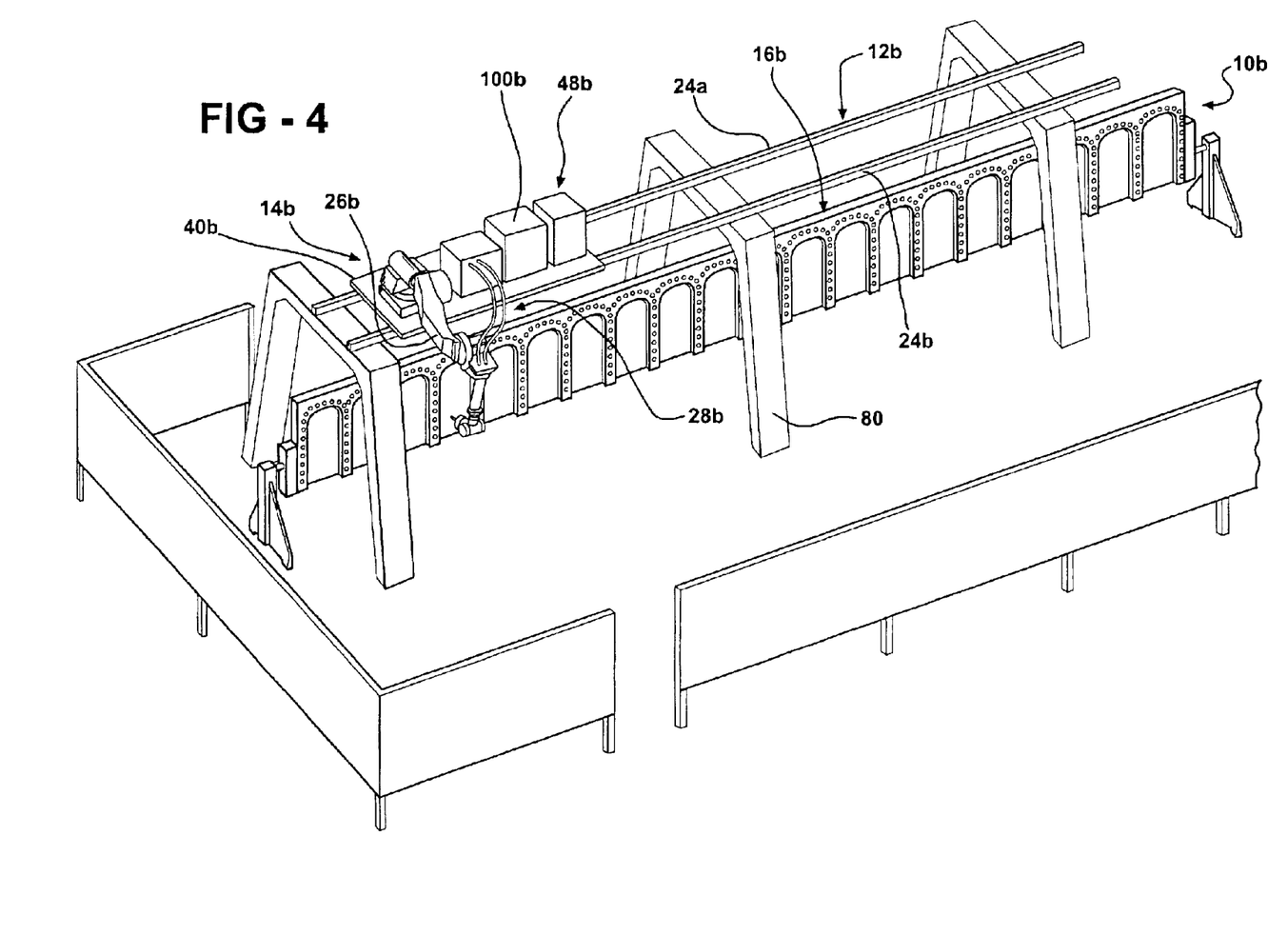
FIG. 4 is an isometric view of an embodiment of the invention wherein the path is defined overhead of the spar.
Figure 5:
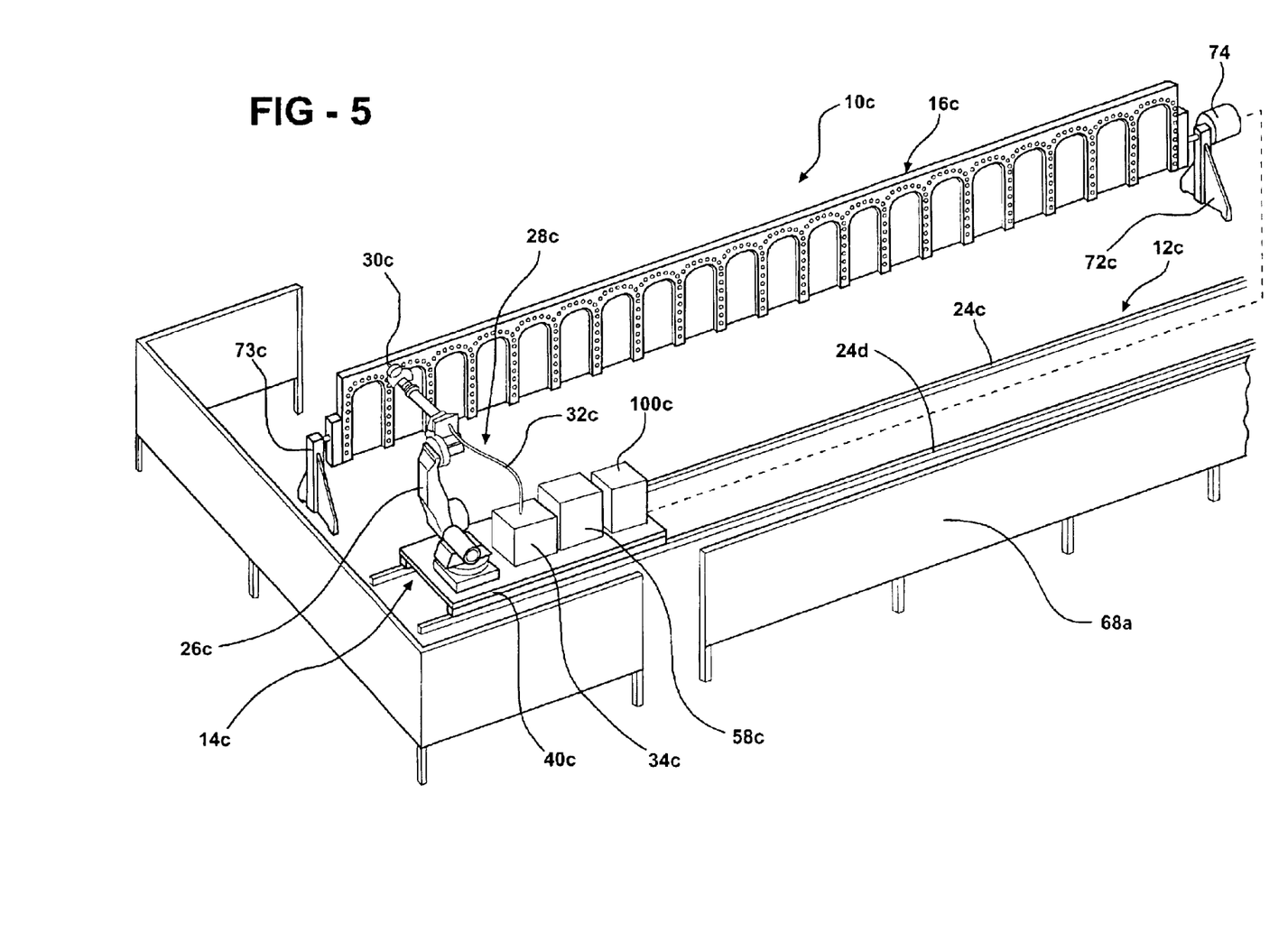
FIG. 5 is an isometric view of an embodiment of the invention including a fixture for rotating the spar.

Referring now to FIG. 3, path means 12a of a workstation 10a can include at least one rail 24 extending along the spar 16a for guiding movement of robotic means 14a. Path means 12a can include at least one rail 24 and at least one mounting block 18b. As shown in FIG. 4, path means 12b associated with workstation 10b can include a plurality of rails 24a, 24b for guiding movement of robotic means 14b. Path means 12b can be disposed overhead of the spar 16b. As shown in FIG. 5, path means 12c associated with workstation 10c can include a plurality of rails 24c, 24d for guiding movement of robotic means 14c. In an embodiment of the invention without mounting blocks, the one or predetermined positions can be defined by a controller 100, described in greater detail below.

Figures 6, 7:
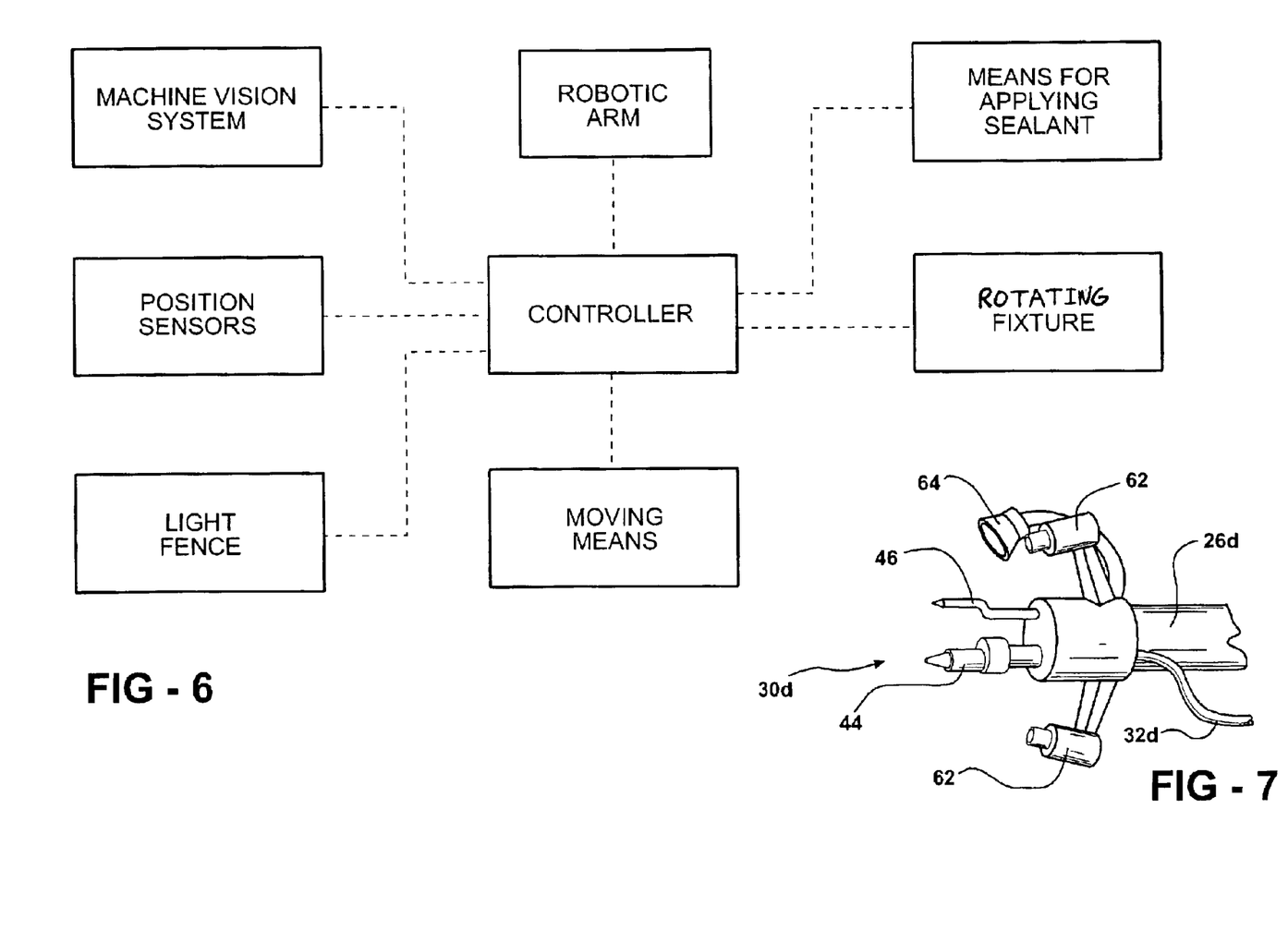
FIG. 6 is schematic view showing a controller in communication with the robotic arm, the sealant applicator, the rotating fixture, moving means, a light fence, position sensors, and a machine vision system.
FIG. 7 is an isometric view of a robotic arm according to an embodiment of the invention for moving two sealant applicators and cameras of a machine vision system.

Referring now to FIG. 1, robotic means 14 includes a robotic arm 26. The robotic arm 26 can be a 6-axis serial link robot, such as a FANUC R2000i robot. Robotic means 14 also includes means 28 for applying sealant with respect to the spar 16 and operably associated with the robotic arm 26. Means 28 can include at least one applicator 30, at least one conduit 32, and pump means 34. At least a portion of sealant applying means 28, such as applicator 30, can be selectively moved by the robotic arm 26 to apply sealant to at least a portion of the spar 16. For example, sealant can be applied to fasteners, such as rivets 36, connecting structural members of the spar 16, as well as seams 38 defined by adjoining structural members of the spar 16. As shown in FIG. 7, the controller 100 can control the robotic arm 26 as well as sealant applying means 28.

In one embodiment of the invention, the robotic arm 26 can have a payload capacity of one hundred sixty-five kilograms or two hundred kilograms and have a reach of 2.65 meters. The robot arm 26 can be a FANUC R2000i/ 165F six axis mechanical unit with forklift pockets; an appropriately sized robot connection cable; J1, J2 and J3 axis over travel limit switches; J1 axis range selection with adjustable heart stop; two user airlines with two inlet ports at the base end and two outlet ports at J3; an EE connector at J3 with eight inputs, eight outputs, HBK, +24 VVC, 0 VDC; an AS connector at J3 with 24 pins for user interface, 24 VDC rated; an AP connector at J3 with eleven pins for power interface, 120 VAC rated; and an ISO flange. The robot arm 26 can be compliant with RIA R15.06 safety requirements. The robotic arm described above is illustrative and not limiting with respect to the present invention.

Pump means 34 of the sealant applying means 28 is shown schematically in FIG. 1 and can include a pump, a fluid dispensing panel, a mix manifold, and a reservoir of sealant. Sealant can be pumped by pump means 34 through at least one conduit 32 to the applicator 30. Pump means 34 can pump one or more sealant materials through one or more conduits 32 to the applicator 30. Referring now to FIG. 5, means 28c includes pump means 34c, an applicator 30c and one conduit 32c. The at least one applicator 30 can include two applicators. Referring now to FIG. 7, applicator 30d can include a first, or swirling applicator tool 44 and a second, or standard applicator 46. The applicators 44, 46 can be concurrently mountable with respect to the robotic arm 26 or exchangeable with respect to the robotic arm 26. Each applicator can be preferred for applying sealant to a particular portion of the spar 16. In particular, the swirling applicator 44 can be used to apply a tract of sealant to a seam 38 of the spar 16. The standard applicator 46 can be preferred to apply a bead of sealant to a rivet 36 of the spar 16. Additional applicators can be disposed on the robotic arm 26d to provide different sealing configurations. Means 28 can include at least one valve 29 associated with one of the pump means 34 and the applicator 30 to selectively control the flow of sealant with respect to the applicator 30, including selectively controlling the flow of sealant through one of applicators 44, 46.

In one embodiment of the invention, sealant applying means 28 can be a Graco Precision Flow XL sealant applicator including a dual fluid plate, electric dispense for medium and high viscosity sealants, and a heliacal gear flow meter. Sealant applying means 28 can also include a Graco Proportioner 8,900 with a variable proportioned for 6:1 to 12:1 ratio range, a fifty-five gallon ram package with hoses to proportions, a five gallon ram package for catalysts with hoses to proportioner, pneumatic controls/solenoids, runaway valves and a filter/regulator/coalescer. Sealant applying means 28 can include six mixing manifolds filled with static mixing elements. Two dispensing valves can be disposed for each of the applicators 44, 46 to enhance change out during transition of parts and also to allow the wetted dispensing valve to be cleaned and serviced. The sealant applying means 28 can dispense a 2K-polysulfide mix on demand or by a multiple cartridge dispense system. The above-described sealant applying means is illustrative and not limiting.

Referring now to FIG. 1, the workstation 10 can also include means 48 for moving robotic means 14 along path means 12. Means 48 can be disposed along the path and include motors 50 and 52 disposed at opposite ends of the path means 12. Motors 50, 52 can move the robotic means 14 away from the starting position and towards the starting position with cables 54 and 56, respectively. As shown in FIG. 3, means 48a can move along the path means 12 with the robotic arm 26a and include a motor 58. Motor 58 can be associated with wheels (not shown) engageable with the rail 24 or with a floor of the manufacturing area to selectively move robotic means 14a in opposite directions along path means 12a.

Referring now to FIG. 1, robotic means 14 can also include a platform 40 for supporting the robotic arm 26. The platform 40 can also support sealant applying means 28. As shown in FIG. 3, platform 40a can support robotic arm 26a, sealant applying means 28a, means 48a for moving robotic means 14a, and controller 100a during movement along the path 12a. As shown in FIG. 4, platform 40b can support robotic arm 26b, sealant applying means 28b, means 48b for moving robotic means 14b, and controller 100b during movement along the path 12b. As shown in FIG. 5, platform 40c can support robotic arm 26c, pump means 34c, motor 58c, and controller 100c during movement along the path 12b.

Referring now to FIG. 1, the robotic arm 26 can include moving means 27 to move the robotic arm 26 relative to the platform 40. For example, the platform 40 can be thirty feet to thirty-five feet in length and the robotic arm 26 can be moveable along a rail 42 disposed on the platform 40. The rail 42 can be twenty feet long. The rail 42 and platform 40 can be sized as desired. Preferably, the robot arm 26 can be moveable along the rail 42 and can include a robot rail unit with hard stops and electrical limit sensors, rack and pinion drive unit with repeatability of +/−0.005 inches.

The workstation 10 can also include means for sensing the position of robotic means 14 along path means 12. For example, sensors 60a–60f can be disposed along path means 12 to detect the proximity of the robotic means 14. Alternatively, means 48 for moving robotic means 14 can include sensors for determining the position of robotic means 14. The controller 100 can receive signals emitted by the position sensors corresponding to a position of robot means 14 along path means 12 and control the robotic arm 26, sealant applying means 28, and moving means 48 in response to signals received from the position sensors.

The workstation 10 can also include a machine vision system mountable with respect to robotic means 14 for enhancing the application of sealant with respect to the spar 16. Specifically, the machine vision system can improve the accuracy of placement of sealant with respect to the spar 16 by verifying the position of the robotic arm 26 relative to the spar 16. As shown in FIG. 7, one or more cameras 62 can be disposed on the robotic arm 26d with a light source 64. The cameras 62 can emit a signal to the controller 100 as shown in FIG. 6. The controller 100 can control the robotic arm 26d to move in response to the signals received from the cameras 62. The machine vision system can also detect flaws in a spar such as cracks or apertures. The machine vision system can be VisLOC vision system operable to support up to four cameras.

Referring now to FIG. 1, the workstation 10 can also include means 66 for substantially enclosing robotic means 14. Means 66 can include a fence 68 mounted with respect to the platform 40, as shown in FIG. 1, and moveable along path means 12. The fence 68a, as shown in FIG. 5 can enclose the path means 12c as well as robotic means 14c. A light fence 70 can be associated with the fence 68 to sense a proximity of an object on a side of the spar 16 opposite of path means 12. The light fence 70 can be desirable to enhance the safety of the work station 10 by emitting a signal receivable by the controller 100 when an object is adjacent the opposite side of the spar 16. The controller 100 can stop sealant applying operations in response to a signal received from the light fence 70.

The spar 16 can be maintained by fixtures 72, 73. As shown in FIG. 5, fixtures 72c, 73c can include means 74 for rotating the spar 16. Means 74 can include a motor and associated transmission mounted with respect to one of the fixtures 72c, 73c and means for rotatably supporting the spar 16 mounted with respect to the other of the fixtures 72c, 73c. At workstation 10c, robotic means 14c can move along path means 12c adjacent a first side of the spar 16c to apply sealant to one or more portions of the spar 16c. When robotic means 14c has completed sealing operations with respect to the first side of the spar 16c, the controller 100c can control means 74c to rotate the spar 16c and robotic means 14c can apply sealant to at least one portion of a second side of the spar 16c.

The amount of sealant applied to the spars of an aircraft is significant and can easily eclipse one hundred gallons adding weight and cost to the aircraft. The method and apparatus of the present invention enhances the sealing of the spars. Specifically, the application of sealant can be uniform, the amount of sealant applied can be minimized, and the likelihood of sealing can be enhanced with the present invention. The process steps of the present invention are shown in the simplified flow diagram of FIG. 8. The process starts at step 102. At step 104, the platform supporting the robotic arm can be moved to a predetermined position along path means 12. The predetermined position can be a starting position, or a first position, as shown in FIG. 1, or any other position defined along the path.

In the embodiment of the invention shown in FIG. 1, robotic means 14 can be moved with motor 52 in step 104. For example, the controller 100 can control the motor 52 to retract the cable 56. The cable 56 can be engaged with platform 40 of robotic means 14. The controller 100 can determine the position of the platform 40 along the path means 12 with sensors 60a–60f. When sensors 60a, 60d and 60c emit signals to the controller 100 corresponding to a proximity of the platform 40, the controller 100 can stop the motor 52 from retracting the cable 56. Alternatively, sensors can be associated with the motor 52. After robotic means 14 has been moved, pin 20 can be inserted in aperture 22 and mounting block 18.

Alternatively, robotic means can be moved away from the starting position, as shown in FIG. 1, in step 104. The pin 20 can be removed from the aperture 22 and the controller 100 can control the motor 50 to retract the cable 54. The cable 54 can be engaged with an opposite side of the platform 40 relative to the cable 56. The controller 100 can receive signals from sensors corresponding to proximity of the platform 40. When sensors 60d, 60e and 60f emit signals to the controller 100 corresponding to a proximity of the platform 40, the controller 100 can stop the motor 50 from retracting the cable 54. Alternatively, sensors can be associated with the motor 50. After robotic means 14 has been moved, pin 20 can be inserted in aperture 22 and mounting block 18a.

The controller 100 can be programmed with dimensional data relating to the position of the spar 16 relative to path means 12, the position of the robotic arm 26 with respect to path means 12, and the position of the at least one portion of the spar 16 to receive sealant. The controller 100 can be programmed with the configuration of each spar to be processed at the workstation 10. Differently configured spars can be sealed at the workstation provided by the present invention. The controller 100, as shown in FIG. 1, can be disposed adjacent path means 12 or, as shown in FIG. 3, disposed along the path means 12a adjacent robotic means 14a for movement along path means 12a.

In the embodiment of the invention shown in FIG. 3, the controller 100a can control the motor 58 to move the platform 40a along path means 12a defined by rail 24 in step 104. The platform 40a can be moved to a predetermined position along path means 12a defined by the controller 100a. Specifically, the controller 100a can be programmed with dimensional data associated with the spar 16a, path means 12a, and with predetermined positions along path means 12a. The controller 100a can control the motor 58a to move the platform 40a until the platform 40a has moved to the predetermined position. Means for sensing a position of the platform 40a along the rail 24 can be associated with motor 58 or platform 40a. Before moving the platform 40a, pins can be disassociated with respect to mounting blocks, such as mounting block 18b.

The predetermined positions of the platform 40a along path means 12a can be selected based on the portions of the spar 16a to be sealed. For example, if the portions of the spar 16a to be sealed are evenly distributed along the length of the spar 16a, the predetermined positions can evenly spaced along path means 12a. Alternatively, the predetermined positions can be irregularly spaced along path means 12a. The predetermined positions along path means 12a can also be selected to minimize the number of predetermined positions. Specifically, the predetermined positions can be chosen to maximize a reach of the robotic arm 26a and maximize the number of portions to be sealed at each predetermined position.

In the embodiment of the invention shown in FIG. 4, the controller 100b can control the robotic arm 26b before controlling the motor 58a to move the platform 40b in step 104. Specifically, the robotic arm 26b can be moved to prevent the robotic arm 26b from contacting support beams 80 while the platform 40b is moved along path means 12b.

After the platform has been moved in step 104, step 106 moves the robotic arm in an embodiment of the invention where the robotic arm 26 is moveable relative to the platform 40, as shown in FIG. 1. The robotic arm 26 can be moved to one or more predetermined positions along the rail 42 to apply sealant to the spar 16. The controller 100 can control means 27 to move the robotic arm 26 to one or more predetermined positions along the rail 42.

The predetermined positions of the robotic arm 26 along the rail 42 can be selected based on the portions of the spar 16 to be sealed. For example, if the portions of the spar 16 to be sealed are evenly distributed along the length of the spar 16 adjacent the rail 42, the predetermined positions can evenly spaced along rail 42. Alternatively, the predetermined positions can be irregularly spaced along rail 42. The predetermined positions along rail 42 can also be selected to minimize the number of predetermined positions. Specifically, the predetermined positions can be chosen to maximize a reach of the robotic arm 26a and maximize the number of portions to be sealed at each predetermined position.

Figure 9:
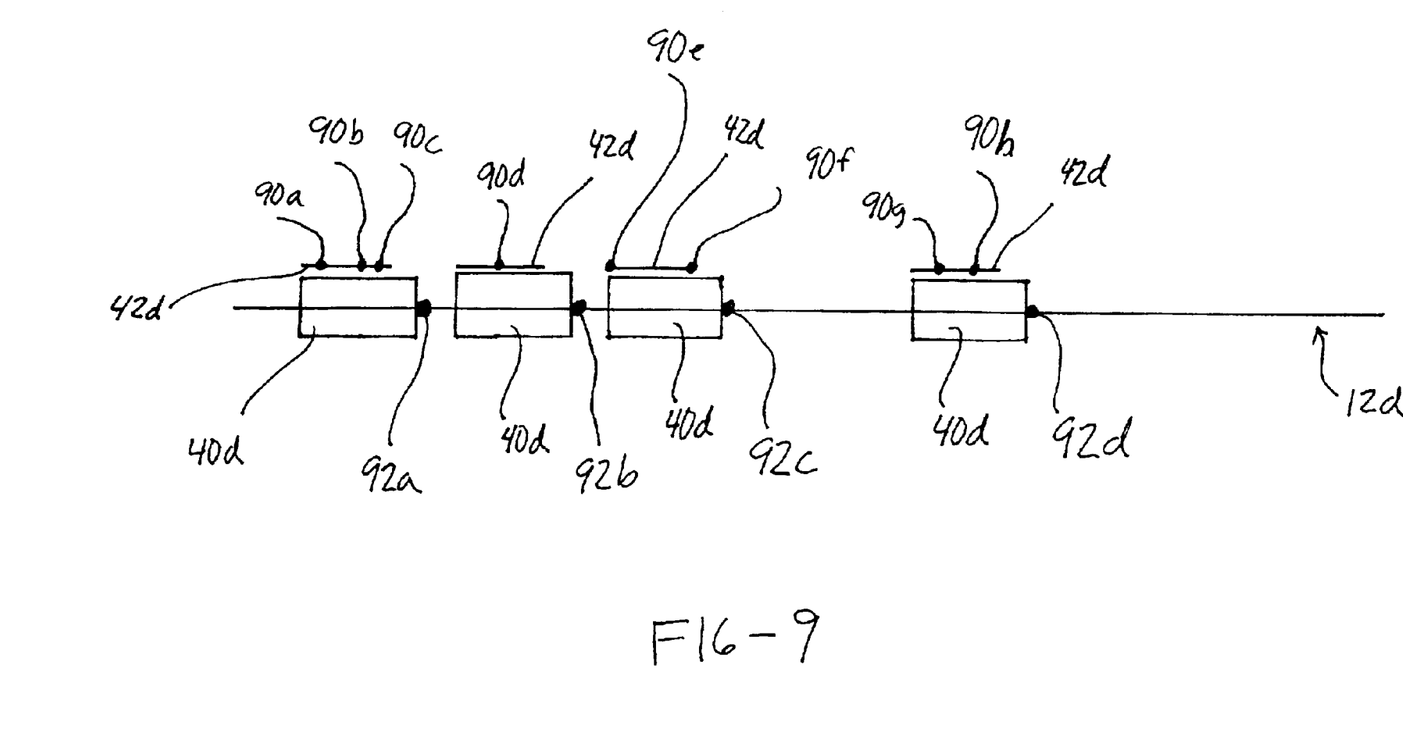
FIG. 9 is a schematic illustration of the predetermined positions of a platform along path means and predetermined positions of a robotic arm relative to the platform.

FIG. 9 shows schematically a platform 40d at four different predetermined positions 92a–92d along path means 12d. At each of the predetermined positions 92a–92d a robotic arm supported by the platform 40d can be moved to one or more positions along a rail 42d associated with the platform 40d. At each of the predetermined positions 90a–90c, the robotic arm can move an associated sealant applicator to apply sealant to a spar. The robotic arm supportable by a platform 40d can be moved between predetermined positions 90a–90c when the platform 40d is at a predetermined position 92a along path means 12d. The robotic arm can be moved to one predetermined position 90d along rail 42a when the platform 40d is at a predetermined position 92c along path means 12d. The robotic arm can be moved between two predetermined positions 90e, 90f along the rail 42a when the platform 40d is at a predetermined position 92c along path means 12d. The predetermined positions 90e, 90f can be defined at opposite ends of the rail 42a. Predetermined positions 90g, 90h of the robotic arm, corresponding to predetermined position 92d of the platform 40d, can be defined intermediate between the ends of the rail 42a.

After the robotic arm has been moved in step 106, if necessary, step 108 moves the applicator and applies sealant to the spar. The controller 100 can be programmed with dimensional data corresponding to the workstation 10 to move the robotic arm 26 and the associated applicator 30 to apply sealant. For example, the controller 100 can be programmed with dimensional data relating to the configuration of the spar such as the position and trajectory of each sealing operation with respect to the spar. Also, the controller 100 can be programmed with the sequence of each sealing operations with respect to the spar. The controller 100 can move the applicator 30 with the robotic arm 26 in accordance with the dimensional data and a control program stored in memory.

For example, the controller 100, in accordance with a control program and a dimensional data stored in memory, can move the robotic arm 26 to position the applicator 30 adjacent the spar 16 and apply sealant. During movement of the robotic arm 26 to move the applicator 30, the machine vision system, including camera 62, can emit a signal to the controller 100 corresponding to a position of the robotic arm 26 and applicator 30 relative to the spar 16. In particular, the image sensed by the camera can be compared with an image stored in the memory of the controller 100. If the image received from the camera does not correspond to the image stored in memory, the controller 100 can move the robotic arm 26. The image stored in memory corresponds to a preferred position of the robotic arm 26 relative to the spar 16. The controller 100e can selectively control a light 64 to emit light when desired.

The controller can move the robotic arm 26d so that the preferred applicator 30, such as the swirling applicator 44 or the standard applicator 46 shown in FIG. 7, is positioned adjacent the at least one portion of the spar 16 to be sealed. The controller can also control valve 29 associated with the applicator 30 or pump means 34 for directing flow of sealant to one of the swirling applicator 44 or the standard applicator 46.

Sealant is applied to the at least one portion of the spar 16. If the at least one portion of the spar 16 is a rivet, the controller 100 can control the robotic arm 26d to move the standard applicator 46 adjacent the rivet and can control means 28 to dispense a quantity of sealant corresponding to a bead of sealant. Preferably, fasteners, such as rivets, are sealed by a one inch round bead having a thickness of three-eight (3/8) inch. Preferably, the total volume of the bead is 4.9 cubic centimeters. Preferably, the time required to dispense the sealant with respect to each rivet 36 is 1.2 seconds.

If the at least one portion of the spar 16 is a seam 38, the controller 100 can control the robotic arm 26d to position the swirling applicator 44 adjacent the seam 38 and can control means 28 to dispense a quantity of sealant corresponding to a tract of sealant along the seam 38. The controller 100 can move the robotic arm 26d so that the swirling applicator 44 can apply sealant along the length or trajectory of the seam 38.

Step 110 determines if all portions of the spar to be sealed have been sealed. If sealing operations are complete, the process ends at step 112. If sealing operations are not complete, step 114 determines if the spar 16 should be rotated in an embodiment of the invention including means 74 to rotate the spar 16. Referring now to FIG. 5, the controller 100d can control means 74 operably associated with a fixture 72 for rotating the spar 16c. After the platform 40c has moved the length of path means 12c and sealant has been applied to a first side of the spar 16c, the spar 16c can be rotated and the platform 40c can be moved along path means 12c in an opposite direction to apply sealant to a second side of the spar 16c. Sealant can be applied to the spar 16c at predetermined positions along path means 12c as the platform 40c is moved in either direction with respect to path means 12c.

If the spar is not to be rotated at step 114 or after the spar is rotated at step 116, the process continues to step 118. Step 118 determines if the robotic arm 26 should be moved. Referring now to FIGS. 1 and 9, the robotic arm 26 can be moved relative to the platform 40 along a rail 42 in an embodiment of the invention. If the robotic arm 26 is not moved, the process returns to step 108 and the applicator 30 is moved to a second portion of the spar 16 to be sealed. Preferably, if sealant is to be applied to a plurality of portions of the spar 16, a maximum number of said portions can be sealed with the robotic arm 26 at any one of the predetermined positions. Preferably, the cycle time to index the robotic arm 26 to each rivet 36 or seam 38 is 1.5 seconds. Preferably, the speed of the robot is 150 millimeters per second.

If the robotic arm is to be moved, the process continues to step 120 to determine if the platform is to be moved. If the robotic arm is to be moved and the platform is be maintained in a current position, the process returns to step 106. If both the platform and the robotic arm are to be moved, the process returns to step 104. In an embodiment of the invention as shown in FIG. 4, the path means 12b includes beans 80 for supporting overhead rails 24a and 24b. The robotic arm 26b can be moved prior to movement of the platform 40b to avoid a collision with one of the beams 80.

Figure 8:
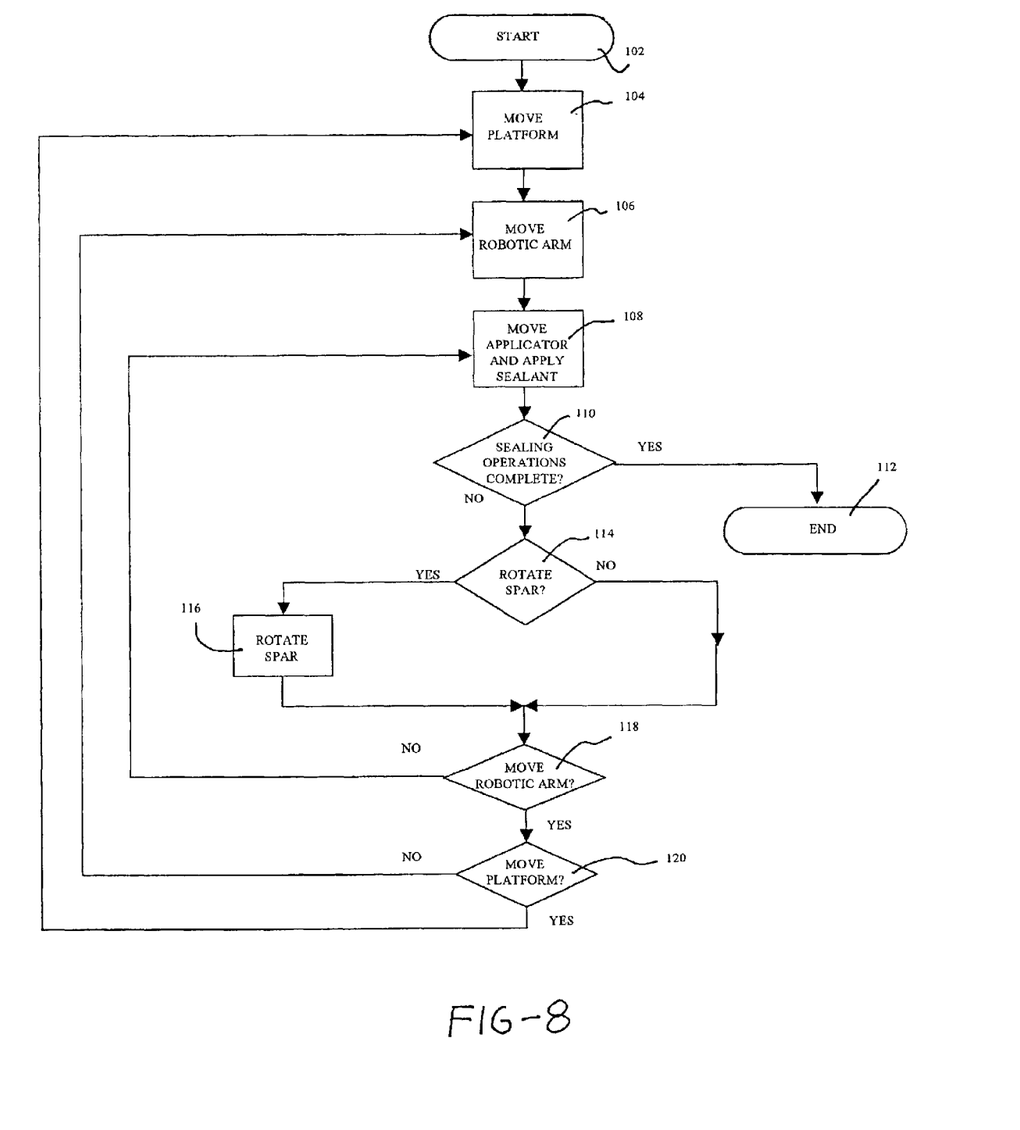
FIG. 8 is a simplified flow diagram illustrating the steps performed by the apparatus and method of an embodiment of the invention.

At any time during the process shown in the simplified flow diagram of FIG. 8, the controller 100 can be operable to receive a signal from the light fence 70 and stop the process. If an object, including an individual, come into proximity with a second side of the spar 16, the light fence 70 can emit a signal to the controller 100. In response to the signal received from the light fence 70, the controller 100 can cease sealing operations until the object is not detected by the light fence 70 or after the controller 100 receives input from a user.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and-scope of the appended claims, which scope is to be accorded the broadest interpretation so as to encompass all such modifications and equivalent structures as is permitted under the law.

What is claimed is:

1. A method for processing a spar comprising the steps of:
   defining a path along the spar with path means;
   applying sealant to at least a portion of the spar with robotic means moveable along the path; and
   rotating the spar to apply sealant to first and second sides of the spar.

2. The method of claim 1 wherein the applying step further comprises the step of:
   moving a robotic arm in response to a signal emitted by a machine vision system.

3. The method of claim 1 further comprising the step of:
   confirming a position of robotic means along the path with sensors before the applying step.

4. The method of claim 1 wherein the applying step further comprises the step of:
   selectively moving robotic means in a first direction followed by a second direction onposite the first direction along at least a portion of the path to apply sealant with respect to the spar.

5. The method of claim 1 wherein the applying step further comprises the step of:
   disposing a robotic arm on a platform moveable along the path where the platform is moveable along the path and the robotic arm is moveable relative to the platform.

6. The method of claim 1 wherein the applying step further comprises the step of:

applying sealant to a first portion of the spar with a first applicator; and applying sealant to a second portion of the spar with a second applicator where both first and second applicators are concurrently moveable along the path.

7. The method of claim 1, wherein the step of rotating the spar further comprises rotating the spar about a longitudinal axis of the spar.

8. A method of processing a spar comprising:

mounting the spar to a fixture;

defining a path of travel for moving a robot adjacent a length of the spar;

positioning the robot at a predetermined location along the path of travel adjacent a first side of the spar;

applying a sealant to the first side of the spar by means of an applicator operably connected to the robot;

rotating the spar about at least one connection to the fixture so as to enable the robot to access a second side of the spar;

positioning the robot at a predetermined location along the path of travel adjacent the second side of the spar; and applying sealant through the applicator to the second side of the spar.

9. The method of claim 8 further comprising the steps of:

sensing position of the robot along the path of travel; and adjusting the position of the robot along the path of travel based, at least in part, on the sensed position of the robot.

10. The method of claim 8 further comprising the step of positioning the applicator at a plurality of successive positions adjacent the spar for applying the sealant to a plurality of predetermined locations along at least one of the first and second sides of the spar.

11. The method of claim 10, wherein the step of positioning the applicator at a plurality of successive positions adjacent the spar occurs while maintaining the positioning of the robot with respect to the path of travel.

12. The method claim 8 further comprising the step of verifying the positioning of the applicator relative to the spar prior to applying the sealant to at least one of the first and second sides of the spar.

13. The method of claim 8 further comprising the steps of:

sensing the position of the applicator relative to the spar;

comparing the sensed position of the applicator to dimensional data corresponding to a location along the length of the spar at which the sealant is to be applied; and repositioning the applicator based, at least in part, on the comparison of the sensed position of the applicator to the dimensional data of the location along the spar at which the sealant is to be applied.

14. The method of claim 8 further comprising the steps of:

capturing an image of at least a portion of a surface of the spar;

comparing the captured image to a preselected sample image;

positioning the applicator relative to the spar based, at least in part, on the comparison of the captured image to the preselected sample image.

* * * * *